US011716264B2

(12) United States Patent
Nainar et al.

(10) Patent No.: US 11,716,264 B2
(45) Date of Patent: Aug. 1, 2023

(54) IN SITU TRIGGERED FUNCTION AS A SERVICE WITHIN A SERVICE MESH (71) Applicant: Cisco Technology, Inc., San Jose, CA (US)

(72) Inventors: Nagendra Kumar Nainar, Morrisville, NC (US); Carlos M. Pignataro, Cary, NC (US); Rajiv Asati, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 380 days.

(21) Appl. No.: 16/102,395

(22) Filed: Aug. 13, 2018

(65) Prior Publication Data
US 2020/0052982 A1 Feb. 13, 2020

(51) Int. Cl.
H04L 12/26 (2006.01)
G06F 9/48 (2006.01)
G06F 8/41 (2018.01)
H04L 43/028 (2022.01)

(52) U.S. Cl.
CPC .......... *H04L 43/028* (2013.01); *G06F 8/4441* (2013.01); *G06F 9/4881* (2013.01)

(58) Field of Classification Search
CPC .. G06F 9/44521; G06F 8/4441; G06F 9/4881; G06F 9/4843; H04L 43/028
See application file for complete search history.

(56) References Cited

U.S. PATENT DOCUMENTS

| 6,438,621 B1 | 8/2002 | Kanamori et al. |
| 7,055,146 B1 | 5/2006 | Durr et al. |
| 8,826,276 B1 | 9/2014 | Li et al. |
| 9,838,376 B1 | 12/2017 | Lander et al. |

(Continued)

FOREIGN PATENT DOCUMENTS

EP 0483970 A1 5/1992

OTHER PUBLICATIONS

International Search Report and Written Opinion from the International Searching Authority, dated Oct. 30, 2019, 14 pages, for corresponding International Patent Application No. PCT/US2019/046179.

(Continued)

*Primary Examiner* — Walli Z Butt
*Assistant Examiner* — Thad N Defauw
(74) *Attorney, Agent, or Firm* — Polsinelli (57) ABSTRACT The present technology is directed to a system and method for automatic triggering of relevant code segments corresponding to a sequence of code segments or function codes having a preferred execution order. The automatic triggering action is based on the snooping of a response generated from an execution of a previous code segment. Information with respect to the next code segment in the preferred execution order may be obtained by directing a network proxy, such as Envoy to snoop the Uniform Resource Identifier (URI) field of a response packet being forwarded to a client entity. In this way, a network proxy may preemptively spawn and instantiate the following function codes (pointed to by the snooped Uniform Resource Identifier) prior to receiving the corresponding client request. As such, by the time a client request for the subsequent function code is received the code ready for execution.

20 Claims, 4 Drawing Sheets

(56) References Cited

U.S. PATENT DOCUMENTS

| | | | |
|---|---|---|---|
| 9,917,745 B2 | 3/2018 | Aldrin | |
| 10,304,349 B1* | 5/2019 | Stickle | G09B 7/02 |
| 2003/0079215 A1 | 4/2003 | Hundt et al. | |
| 2004/0187027 A1 | 9/2004 | Chan | |
| 2007/0191101 A1 | 8/2007 | Coliz et al. | |
| 2012/0131321 A1* | 5/2012 | Jitkoff | G06F 9/451 |
| | | | 713/2 |
| 2012/0137201 A1* | 5/2012 | White | G06F 16/957 |
| | | | 715/205 |
| 2016/0112475 A1* | 4/2016 | Lawson | H04L 67/2823 |
| | | | 709/204 |
| 2016/0112502 A1 | 4/2016 | Clarke et al. | |
| 2017/0060562 A1* | 3/2017 | Lopez | G06F 8/60 |
| 2017/0111209 A1 | 4/2017 | Ward et al. | |
| 2017/0171104 A1* | 6/2017 | Zhou | H04L 67/02 |
| 2017/0230442 A1* | 8/2017 | Denoual | H04L 65/612 |
| 2017/0364698 A1* | 12/2017 | Goldfarb | G06F 16/9024 |
| 2018/0113940 A1* | 4/2018 | Mora López | G06F 9/46 |
| 2018/0115523 A1* | 4/2018 | Subbarayan | H04L 63/0807 |
| 2018/0191680 A1* | 7/2018 | Ahuja | H04L 63/0245 |
| 2018/0198845 A1 | 7/2018 | Kulp et al. | |
| 2018/0205552 A1* | 7/2018 | Struttmann | H04L 9/0637 |
| 2018/0285009 A1* | 10/2018 | Guim Bernat | G06F 3/0673 |
| 2018/0302487 A1* | 10/2018 | Burns | H04L 67/5651 |
| 2019/0075154 A1* | 3/2019 | Zhang | H04L 41/5048 |
| 2019/0114350 A1* | 4/2019 | Shi | G06F 9/3005 |
| 2019/0332781 A1* | 10/2019 | Natanzon | G06F 3/065 |
| 2019/0377604 A1* | 12/2019 | Cybulski | G06F 9/5072 |
| 2020/0050494 A1* | 2/2020 | Bartfai-Walcott | G06F 9/5061 |

OTHER PUBLICATIONS

Eludiora et al., "A Load Balancing Policy for Distributed Web Service," Int. J. Communications, Network and System Sciences, Aug. 2010. Vol. 3, pp. 645-654.

* cited by examiner

IN SITU TRIGGERED FUNCTION AS A SERVICE WITHIN A SERVICE MESH

TECHNICAL FIELD

The present technology pertains to Serverless computing. More specifically it is directed to improving performance of Serverless architecture in a service mesh environment.

BACKGROUND

Real world implementations of microservice-based architecture, must be able to implement, at microservice level, most of the functionalities supported by a centralized bus (i.e., Enterprise Service Bus utilized in Service Oriented Architecture implementation). Therefore, although the same set of fundamental problems are addressed, with microservices they are addressed at different dimensions. For example, a scenario involving calling multiple downstream services in resilient manner and exposing the functionality as a another (composite) service, may be easily handled with an Enterprise Service Bus architecture, by leveraging the inbuilt capabilities of the architecture, for building virtual/composite services and functionalities such as circuit breakers, timeouts and service discovery etc., which are useful during inter-service communication. However, implementing the same scenario in microservice based architecture must be achieved using a set of (composite and atomic) microservices, and without the benefit of a centralized integration layer of an Enterprise Service Bus. Therefore in microservice based architecture all required functionalities must be implemented at the microservices level.

A microservice comprises of a piece of business logic that implements one or more functionalities, service composition/integration logic or performs a computations. In addition to a piece of business logic, a microservice also includes network functions to facilitate the inter-service communication mechanisms (and enable basic service invocation through a given protocol, apply resiliency and stability patterns, service discovery etc.) These network functions may be built on top of the underlying Operating System level network stack. In such a microservice based architecture implementing functionalities related to service-to-service communication from scratch would be exceedingly complicated. A great deal of time/effort/resources must be dedicated to building service-to-service communication functionalities instead of implementing the business logic. The situation is made worse if multiple technologies are used to build microservices (such as multiple programming languages), because the same amount of time and effort must be duplicated across different languages. Therefore, the most complex challenge in realizing microservice architecture is not building the services themselves, but the communication between services. Since most of the inter-service communication requirements are quite generic across all microservices implementations, a remedial solution could involve offloading all such tasks to a different layer, such that the service code can be kept independent. This may be implemented with a service mesh.

In a nutshell, a service mesh is an inter-service communication infrastructure for making service to service communication safe, reliable, observable and configurable. In a service mesh environment, a given microservice does not directly communicate with the other microservices, instead all service-to-service communications will take place on-top of a software component called service mesh. A service mesh may also provide built-in support for some network functions such as fault tolerance (resiliency) and service discovery.

The concept of Function as a Service (FaaS) associated with Serverless computing is closely tied in with microservice based architecture. Software developers may leverage this approach to deploy an individual function (that may be expressed as a single or a sequence of one or more microservices), action, or piece of business logic directly into a cloud network. These functions, when invoked, are expected to start within milliseconds and process individual requests after which the process ends. The Function as a Service framework enables complete abstraction of servers away from developers thus yielding, for example, a billing system based on consumption and execution, and services that are event-driven and instantaneously scalable. Function as a Service may be particularly suitable for high volume transaction. For example when a transaction or a piece of code is executed hundreds of times a second, isolating the corresponding logic to a function that may be easily scaled would be highly beneficial. There may be many potential uses for functions, for example, they offer an effective model for executing scheduled tasks (running a certain piece of code according to a predefined schedule) or manually running a piece of code whenever necessary. Another suitable use case may involve processing of web request and/or queue messages.

Resiliency and scalability are essential attributes of any application architecture. Utilizing the Function as a Service model provides a flexible way of adding scalability and resilience to the application architecture. It may also reduce costs as computing resources are allocated according to the requirements of an application. The Function as a Service architecture is auto-scalable, when traffic or load rises, an Auto-scalar adds resources to handle the extra activity and removes resources when the traffic or load lowers to help in reducing the costs. It also eliminates the need to manage servers on cloud, and replaces them with pervasive use of functional computing resources.

In Serverless architecture, short-lived functions are invoked upon each request and the provider may bill a client for running each individual function or business logic (thus the name Functions as a Service or FaaS). A function in a Serverless or Function as a Service architecture is a small, discrete and reusable chunk of code that may be represented as a single or a sequence of one or more microservice operations. These functions could also be chained together. For example, a web request could write to a queue, which is then picked up by a different function.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Systems, methods, and devices are disclosed and directed to automated invocation of related function codes or microservice instances in a Serverless architecture. A controller entity or a network proxy agent, in addition to facilitating invocation and execution of a function code in response to a trigger such as an initial client request and forwarding the corresponding response packet(s) back to a client entity, may also perform additional actions on the forwarded/routed packets. For example, client-destined response packet(s) may be snooped to reveal information regarding any function code that a subsequent client request/query may target. Snooping of the return traffic may comprise inspection of a Uniform Resource Identifier field for any information with regards to identity, location and related access/communication protocol, among other relevant details associated with a next (micro)service or code segment. Based on the snooped information, a network proxy, such as Envoy, may preemptively spawn and instantiate the following function codes (pointed to by the snooped Uniform Resource Identifier) prior to receiving the corresponding client request as disclosed by some embodiments of the technology. The triggering event may be a client request for an initial function code in a service chain that implements a desired functionality. Aspects of the technology are further directed to implementing automatic instantiation/invocation of subsequent (micro)service code following an initial event-triggered invocation and execution of a (micro)service code that is first among plurality of (micro)service codes having a preferred execution order.

EXAMPLE EMBODIMENTS

Disclosed are systems, methods, and non-transitory computer-readable storage media for auto triggering of function codes associated with a service chain. Embodiments of the technology are further directed to implementation of a network proxy with augmented functionality resulting in improvements in the response time of underlying service mesh architecture. A network proxy like ENVOY may be configured to inspect data traffic generated in response to a client request. The inspection is directed at discovering the next action or set of actions that the client may be required to initiate. If the discovered action involves execution of a piece of code such as a function or a (micro)service instance, the network proxy will facilitate the set up and instantiation of the snooped function code such that it is ready to be executed by the time a corresponding request from a client entity is received. Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

A service is a unit of an application with a unique name that other services use to refer to the functionality being called. Service instances may be pods/VMs/containers that implement the service. From a Serverless computing point of view, a function is an abstracted version of a service that may not have any computing resources associated with it. A function may be represented by a piece of code on a host device that encodes certain functionality or business logic. The function code may be invoked and executed by an external entity, in response to a trigger such as occurrence of a particular event.

Serverless computing allows the implementation of service codes as functions without any allocated compute resources. Currently, Function as a Service (FaaS) works more on a demand basis such that whenever there is a trigger (e.g. interesting packet or request for the specific function), an associated controller or network proxy will execute the corresponding software code. The triggers for executing the code may also involve for example, a scheduled task, Hypertext Terminal Protocol (HTTP) request, responding to queue messages, or manual invocation of a piece of code when necessary. From an end user's point of view there may not be a need for dedicated computing resource associated with administration of a server-based service. Instead it may be cheaper to have application related functionality or a piece of business logic implemented as a set of functions (abstracted version of a service, with no associated computing resources) that are executed by an external entity like a compute service such as AWS Lambda. The external entity will monitor certain triggers and invoke and execute the function code in response to certain trigger events. After execution the function may be taken down. This characteristic operation is one distinguishing feature between Server-based and Serverless (Function as a Service) architectures.

In the standard implementation of Serverless model in a service mesh environment a trigger event, such as a client request/query, is required to spawn an instance of the corresponding function code, following which the code may be executed to generate a response that is then forwarded to the client. In cases when a requested functionality requires a sequentially ordered invocation of multiple function codes, the required function codes must be triggered individually by a directed client request for that (micro)service. Execution of each function generates a response that may be forwarded to the client. The response may also include information with regards to a subsequent function code to which the next client request is to be directed. An example relating to the a standard implementation of Function as a Service in a service mesh environment is provided below.

A web service application implemented in a Serverless architecture may be split into multiple functions. For example a front-end function may handle incoming web request (i.e., an http request) and a back-end function may handle processes such as user identity verification and access authentication. In this scenario, an incoming client http request will be pointing towards the front-end function. Upon receiving the http request an external entity such as AWS lambda network proxy will execute the front-end function and forwards the result onto the client. However, if there is a back-end authentication function associated with the web service application, then the requesting user must first establish proper credentials prior to being granted access to the requested web site. In order to appropriately identify the user the front-end function may include an appropriate Uniform Resource Identifier and the required details to be provided by the user (such as a request for user name and password) in its response to the client's http request.

A Uniform Resource Identifier is a string of characters designed for unambiguous identification of resources and is meant for enabling interactions with representations of the said resources over a network using specific protocols. In the case of the example described above, the Uniform Resource Identifier sent back to the client by the front-end function of the web service/application may point to the application's back-end function (i.e., authentication service). Therefore the next set of packets or the next traffic stream from the client will be destined for a completely different service based on the Uniform Resource Identifier, and the next round of negotiation will essentially occur between the client and the authentication function which has to be cold started upon being triggered by the client request.

When Function as a Service (FaaS) model is implemented within a service mesh, each function may have one or more (micro)services corresponding to one or more pieces of code each of which will need to be cold started (instantiated/initialized) and executed when triggered by an event such as a directed client request. Cold starting a function in Serverless platform may take a considerable amount of time to load which can range from about a couple of milliseconds all the way up to a few minutes. Furthermore, this operation will need to wait for a directed client request before it is started. Currently there is no way to instantiate a code segment pointed to in the return traffic to the client, generated as a result of execution of a previous function code, prior to receiving a corresponding trigger (i.e., client request). Therefore described scheme, associated with the standard operation of the associated technologies, results in a operational delay corresponding to spawning and instantiation of a requested (micro)service or function code, generated by every service code request from a client.

Some embodiments of the present technology are directed to improving the latency and delay associated with the standard scheme of implementing micro service based architecture. Towards this purpose, embodiments of the present technology disclose a data plane triggered method to automatically identify and instantiate the relevant function codes following an initial trigger within a service mesh. Embodiments of the present technology provide improvements in the operational response time even when a service mesh is implemented according to Function as a Service model.

Figure 1:
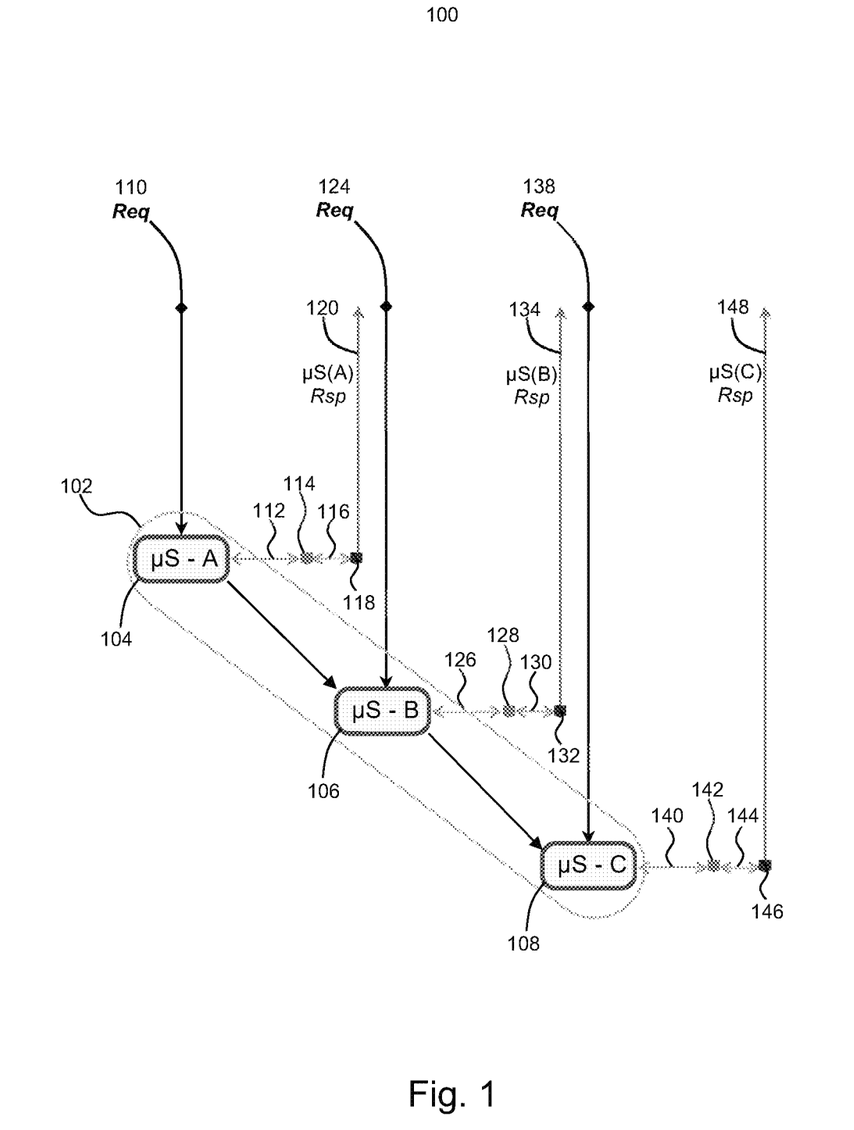
FIG. 1 illustrates a basic operational flow diagram for Serverless computing in a standard service mesh environment.

An Exemplary scenario illustrating inherent operational latency and response time delay associated with Serverless based service mesh environment is illustrated in FIG. 1.

FIG. 1 illustrates a service mesh based Serverless implementation 100 wherein a Function as a Service model is implemented within a service mesh environment. Function 102, as illustrated in FIG. 1, is implemented as a sequence of three (micro)services 104, 106 and 108. With reference to FIG. 1, (micro)service 104, which is first in the sequence, is triggered in response to the detection of the initial query/request 110 from a client entity. (micro)Service 104 corresponds to a code segment or a piece of business logic that carriers out some operation when executed. Upon receiving the initial request 110, the code segment corresponding to (micro)service 104 is instantiated/initialized. The process incurs a delay 112 after which at 114 the code segment is ready to be executed. The execution may further incur a delay 116 after which at 118 a response 120 is generated and forwarded to the client entity. Response 120 may include details about (micro)service 106 in order to direct the client entity to send the next request/query 124 to (micro)service 106.

Upon receiving the request/query 124, code segment corresponding to (micro)service 106 is instantiated/initialized. Again, the process incurs a delay 126 after which at 128 the code segment is ready to be executed. The execution may further incur a delay 130 after which at 132 a response 134 is generated and forwarded to the client entity. Response 134, similar to the previous stage response 120, may include details about the next (micro)service (108 in case of client response 134) which directs the client entity to send the next request/query 138 to (micro)service 108.

Upon receiving the request/query 138, the code segment corresponding to (micro)service 108 is instantiated/initialized. The process incurs a delay 140 after which at 142 the code segment is ready to be executed. The execution may further incur a delay 144 after which at 146 a response 148 is generated and forwarded to the client entity at which point the operation of function 102 is completed.

As illustrated in FIG. 1, in the standard scheme a client request for each code segment must be directed to each code segment in order to instantiate/initialize and execute the code segment. Some embodiments of the present technology are directed at improving the latency and delay associated with the standard scheme of implementing micro service based architecture as illustrated and described with reference to FIG. 1. Towards this purpose, embodiments of the present technology disclose a data plane triggered method to automatically identify and instantiate the relevant function codes following an initial trigger within a service mesh. Embodiments of the present technology provide improvements in the operational response time even when a service mesh is implemented according to Function as a Service model. This may be accomplished, according to some embodiments, by having the initial request (i.e., http request in the aforementioned example) trigger the other set of related functions such that the relevant function codes are instantiated and ready for execution by the time a client request pointing to the particular code segment is received.

As described above, when an event, for example http request, triggers an associated service function (as expressed by the function code), the return traffic, corresponding to the execution outcome of the function code, is sent back the client. The response packet(s) will carry all relevant information such as the Uniform Resource Identifier of the next service function, along with any relevant description, and pertinent cookie details required by the client to carry out additional details associated with invocation and execution of the next service.

In accordance to some embodiments of the present technology, a network communication proxy, for example data plane portion of the service mesh (i.e., Envoy) may carry out additional functionalities in addition to the required layer 7 routing and forwarding of response messages (i.e., http response) back to the client. In accordance to some embodiments, the additional functionalities, carried out by the network communication proxy (i.e., Envoy), comprise snooping of the response traffic destined for the client. For example, Envoy will snoop the packet (i.e., look into the payload of the http packet) to discover whether a Uniform Resource Identifier is present within the packet and if so, to identify and locate the said Uniform Resource Identifier.

If the requested webpage is a simple webpage which does not require authentication (or if the authentication requirement is obviated due to the nature of the requesting user), there may not be a need for invoking a back-end authentication function. So in these cases, there may not be a next service function for the return response to point towards and hence, the response traffic will not contain a Uniform Resource Identifier. However, according to some embodiments, if an associated network proxy (i.e., Envoy), discovers a Uniform Resource Identifier within the response packet when it snoops the return traffic, it will identify the associated service function for the discovered URI and, in accordance to some embodiments, may send a service call notifying the appropriate service of the incoming client request to facilitated instantiation/initialization of the relevant function codes prior to receiving the corresponding request form the client.

In Serverless architecture implemented in accordance to some embodiments of the present technology, instantiation of all function codes following an initial function code may be triggered by the execution of the previous function code. This may be accomplished, in some embodiments, by snooping the response traffic to the client, generated by an execution of a previous function code, to thereby inspect and analyze a Uniform Resource Identifier (URI) that may be present in the payload of the response traffic. By inspecting the Uniform Resource Identifier the next function code in the chain may be identified and located. Hence a local communication management entity, such as Envoy may appropriately trigger the instantiation of one or more subsequent function code while forwarding a response from a previous function code to the client. In this way, by the time a corresponding request/query for the said subsequent function code is received from the client, the function code is ready to be executed and thus any delay associated with set up (instantiation/initialization) of all functions codes following an initial function code (first in the sequence) may be avoided or at the very least reduced.

Figure 2:
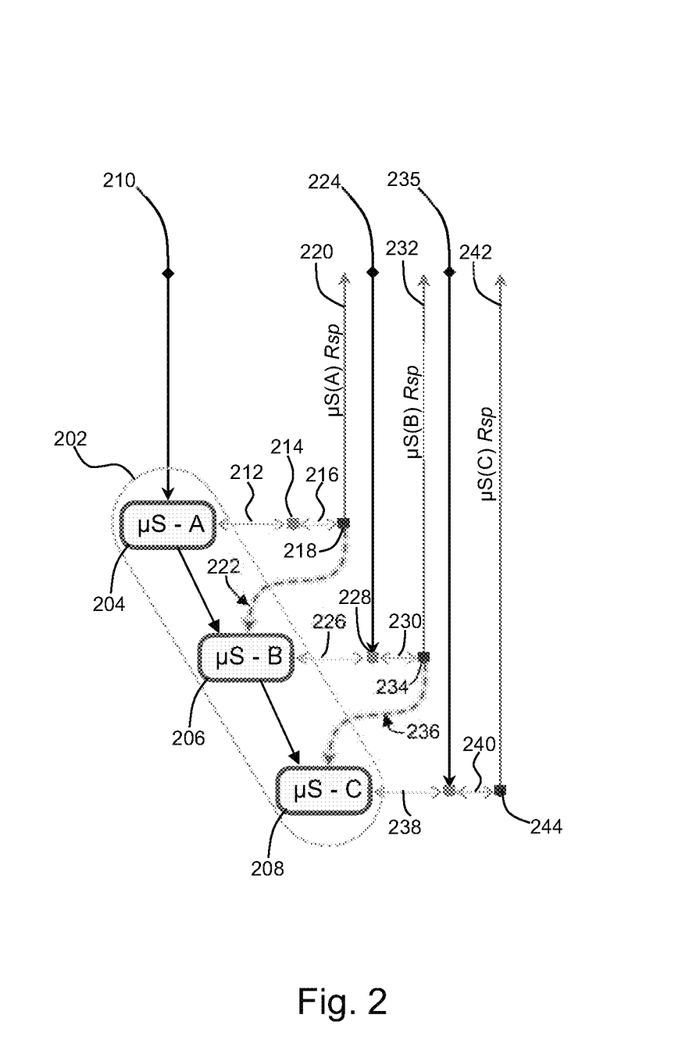
FIG. 2 illustrates operational flow diagram of an enhanced Serverless framework based on in situ triggering of service codes to improve service mesh response time, in accordance to an embodiment of the present technology.

FIG. 2 illustrates an exemplary implementation 200 corresponding to Serverless computing for service mesh architecture as implemented in accordance to some embodiments of the present technology. In Serverless computing implementation 200, a function 202 is appropriately represented as a sequence of three (micro)services 204, 206 and 208 (in the same way as function 102 in FIG. 1). The processing of the initial function code or (micro)service 204 proceeds in a similar fashion as the processing of the initial function code 104 of function 102 illustrated in FIG. 1. This process involves instantiation and execution of the initial function code 204 triggered by detection of the initial query/request 210 sourced from a client entity.

Referencing example 200 in FIG. 2, time span 212 corresponds to the duration of the instantiation process and time span 216 corresponds to the duration of the execution operation in relation to function code 204. Upon completion of the execution operation at 218, a client response 220 is generated and forwarded to the client by a local communication controller or network proxy such as Envoy. However, in addition to performing the required layer 7 routing and forwarding operation, the local network proxy or a communication controller in the exemplary implementation 200 also performs additional actions such as snooping operation 222 on the client destined return traffic 220 in order to detect if any additional function code needs to be instantiated with respect to the function 202. According to some embodiments, snooping operations retrieves information included in a Uniform Resource Identifier field of the return packet(s) to thereby determine the identity, location and associated protocol along with other relevant information corresponding to the next code segment (or function code) that must be invoked and executed as part of the function 202.

Returning back to FIG. 2, the network proxy, based on the Uniform Resource Identifier information snooped from the client destined return traffic 220, identifies, locates and triggers the instantiation of the subsequent function code 206. This functionality is performed in conjunction with or in addition to the appropriate routing and forwarding of the response traffic 220. Therefore the instantiation of function code 206 is triggered prior to receiving a request for the same from the client. In the exemplary case illustrated by the operational flow diagram of FIG. 2, by the time client request 224 directed at function code 206 (as pointed to by the snooped Uniform Resource Identifier from the return traffic 220) is received, the delay 226 associated with the instantiation of function code 206 has already elapsed (instantiation operation is complete) and the function code is ready for execution (as denoted by stage 228 in FIG. 2). The improved response time is attributable in part to the earlier invocation of the function code 206 (based on snooping the return traffic 220 generated by the previous function code 204) in implementation 200 as compared to the corresponding function code 106 in implementation 100. Consequently, the execution ready stage 228 associated with function code 206 in the exemplary embodiment 200 occurs prior to the corresponding execution ready stage 128 associated with function code 106 in implementation 100. This is due to the snooping based triggering mechanism deployed in implementation 200.

Returning once again to FIG. 2, following a delay period 230 associated with the execution of the function code 206, a response packet(s) 232 is generated by the associated proxy service and forwarded to the client at 234. In addition to generating and forwarding of the response traffic 232 to the client, the network proxy is also directed, at stage 234, to perform a snooping operation 236 on the said response traffic. The snooping operation may involve inspection of Uniform Resource Identifier field to retrieve information on the subsequent function code to which the next client query should be directed to. With reference to FIG. 2, the Uniform Resource Identifier field of return packet(s) 232 points to function code 208 which is the next function code in the sequence of function 202. Based on the information retrieved from the snooped Uniform Resource Identifier, the network proxy identifies, locates and invokes the function code 208 ahead of receiving the corresponding client request 235. By the time client request 235 for function code 208 is received the instantiation period 238 has elapsed and the function code is ready to be executed. After expiration of execution period 240, a final client response 242 is generated and forwarded to the client at 244. Since function code or (micro)service 208 constitutes the last portion of the function 202, no Uniform Resource Identifier is returned upon snooping of the response traffic 242 and execution of function 202 is completed.

In some embodiments the Serverless architecture described above is implemented in a service mesh environment. In the aforementioned service mesh environment, data plane functionality may be provided by a Network communication proxy such as Envoy which may perform all the operations with respect to forwarding requests and message to, from and in between (micro)services or function codes. Envoy may be characterized as a self-contained process that is designed to run alongside every application server. All of the Envoys form a transparent communication mesh in which each application sends and receives messages to and from local host and is unaware of the network topology. In essence Envoy mediates and controls all network communication between services in a service mesh. In accordance to some embodiment, in addition to routing/forwarding of request/response packets, Envoy may also be configured to perform a set of actions, such as snooping/sniffing operations, on the packets being forwarded.

Some embodiments of the present technology leverage Envoy to snoop the return packet from initial function code instance and all subsequent function codes to thereby detect if any other code needs to be instantiated for a given function. According to some embodiments, this may involve dynamically updating the RouteRule that Envoy uses. RouteRule provides instructions as to how messages, such as http requests, are to be forwarded between different (micro)services and facilitates communication between different services in a service mesh. According to some embodiments, in addition to layer 7 routing and forwarding of the response packet(s), RouteRule may be statically or dynamically configured to enforce snooping of reply packet(s) and perform additional activities such as trigger the instantiation of the subsequent function code, for example in a service chain, pointed to in the Uniform Resource Identifier field of the snooped replay packet(s).

Once a Uniform Resource Identifier field is snooped, a Network communication proxy (i.e. Envoy) may use a local mapping table to identify whether a snooped Uniform Resource Identifier is pointing to a piece of executable code or a standard container/Virtual Machine. If the snooped Uniform Resource Identifier points to an executable function code or (micro)service, and if the said function code or (micro)service is connected to the same Envoy or Pod, the local Envoy instance (sidecar proxy) may use internal signaling to trigger the instantiation of the function code. If the identified function code is connected to a different/remote Envoy or Pod, local Envoy instance may send signal using in-band mechanism (i.e., iOAM) to trigger the instantiation of the function code. Consequently, when the subsequent client request for the said function code is received, the function code is already brought up, instantiated and ready to be executed. Envoy RouteRule may then be updated again to ensure that the subsequent function code in the sequence is made ready for execution a priori and so on.

Figure 3:
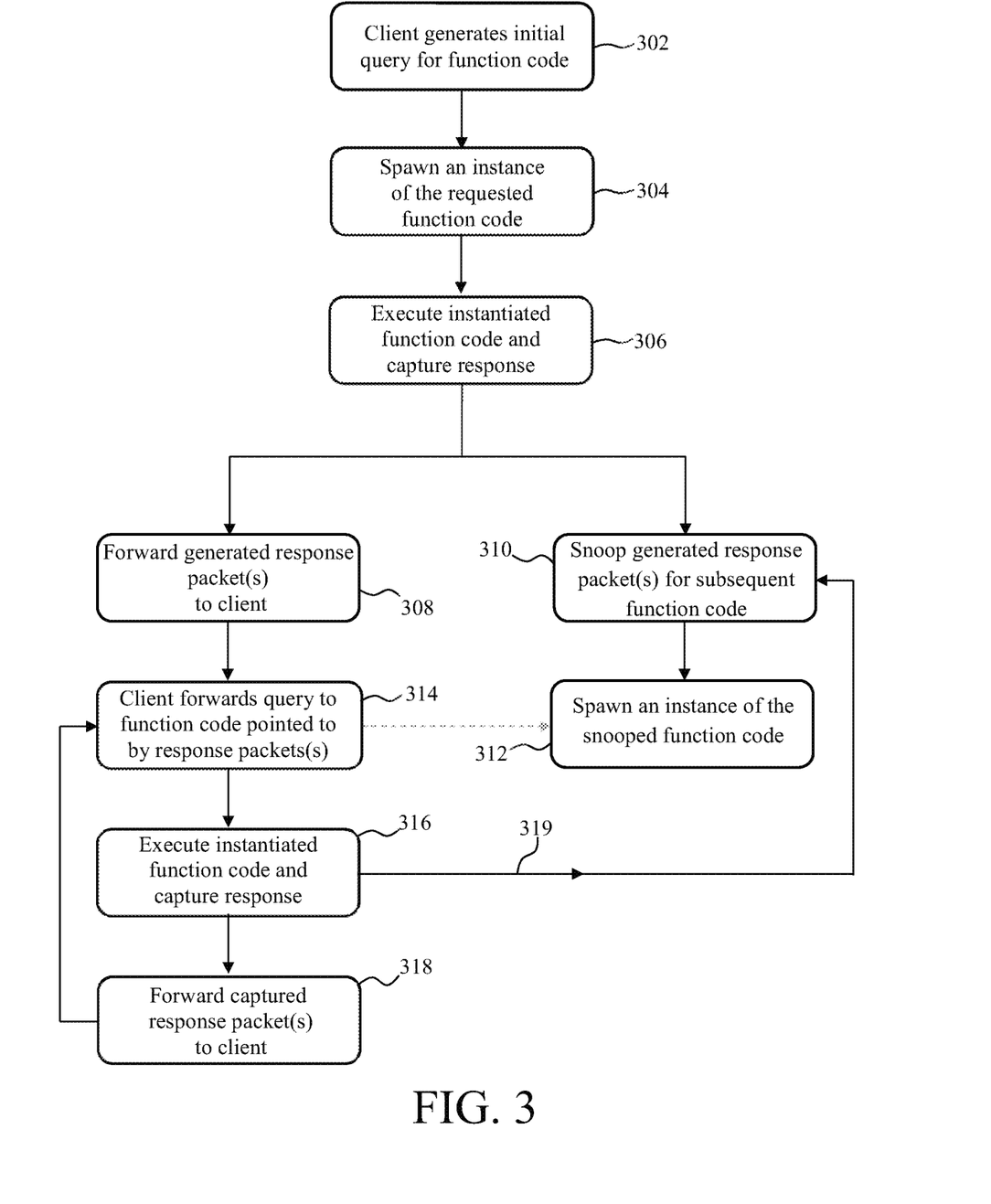
FIG. 3 illustrates basic operational steps for implementing Serverless computing in a service mesh environment, based on in situ triggering of service codes, in accordance to an embodiment of the present technology.

A flow chart 300 illustrated in FIG. 3 provides a basic sequence of operational steps for implementing automatic instantiation of relevant code segments in a service mesh environment, in accordance to some embodiments of the present technology. At 302 a client generates a request for a service. The request is sent out through the internet and routed to the appropriate cloud-based compute/communication service. When the appropriate compute/communication service receives the client request, it locates and instantiate the corresponding function code at 304. At 306, the compute/communication service will execute the function code and a generate a response to the client request. The generated response is forwarded to the client at 308. In addition to forwarding the generated response to the client (308), the compute/communication service also performs a snooping action on the generated response at 310. The snooping action carried out at step 310 is directed at identifying a subsequent function code that may be required in the service of the client request. If a reference to another function code is discovered, in the generated client response, by the snooping operation, an instance of the referenced function code is preemptively spawned at 312 prior to receiving an actual client request for the referenced function code. In this way when at step 314, the client generates and dispatched a request for the referenced function code, the referenced function code is already instantiated and is ready for execution. Therefore, upon receiving a directed client request, the targeted function code snooped from the previous client response is executed and a response is generated at 316. The generated response is then forwarded to the client at 318.

The response generated at 316, in addition to being forwarded to the client (318), is also snooped for a reference to a subsequent service code, as indicated by arrow 319 that points back to step 310. If the snooping action on the return traffic generated at 316, reveals a reference to another service code, step 312 through 318 are repeated. Otherwise the process may be terminated after completion of step 318, as it would constitute the final response that completes the client request generated at 302.

Figure 4:
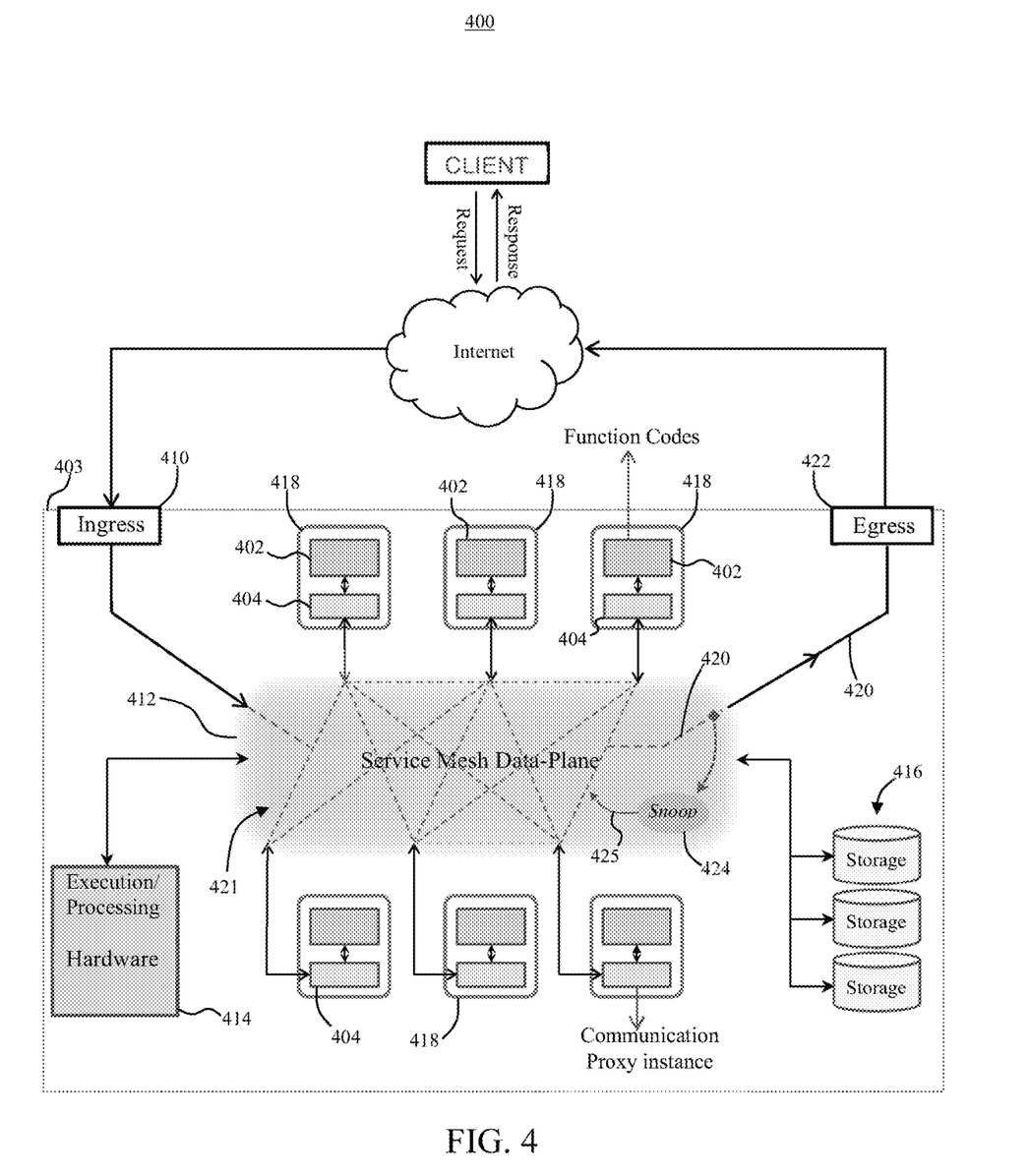
FIG. 4 illustrate a system overview for implementing cloud-based Serverless computing in a service mesh environment, in accordance to an embodiment of the present technology.

An exemplary service mesh based Serverless computing system 400, according to some embodiments of the present technology, is illustrated in FIG. 4. In the Serverless computing system 400, individual functions (function codes) 402 uploaded into a service provider cloud network 403, may each be paired up with a local proxy instance 404. This will enable communication among different (micro)services/functions and facilitate other service mesh data plane functionalities.

Referencing FIG. 4, client 408 generates a request for a particular service (ie., http request for accessing a website). The request is routed through the internet, to an entry/ingress point 410 of the appropriate service provider cloud network 403 and onto a service mesh based computing platform 412. If the requested service code (function) is not already uploaded onto a computing/execution module 414, it may be located and accessed from a storage service 416, encapsulated into an appropriate runtime environment 418 (i.e., container, Virtual Machine, etc.) and subsequently executed using computing/execution module 414. The generated response 420 may then be forwarded, by the service mesh data-plane 421, through the egress point 422 and onto the client.

However, in addition to the forwarding operation, exemplary system 400, implemented in accordance to some embodiments of the present technology, may perform additional actions on the generated response. Referring back to FIG. 4, the generated response 420, destined towards the Egress point 422, is snooped (424), by the service mesh data plane controller or proxy software 421 for relevant information. For example, content of a Uniform Resource Identifier field in the generated response (return traffic) 420 may be snooped for information regarding the next function code 425 that needs to be invoked and executed as a next stage of completing the client request. Once a subsequent function code 425, related to the client request and pointed to by the snooped return response 420 is identified and located by the system, the appropriate service is alerted, ahead of a directed client request, to initiate the preparation and set up of the function code 425 referenced in the snooped Uniform Resource Identifier.

According to some embodiment, the snooping operation may be followed by one or more actions as defined by a set of snoop rules. For example, the snoop rule may direct a network proxy or communication controller, such as Envoy, to perform a set of prescribed operations on the snooped Uniform Resource Identifier. For example, snoop rule may direct Envoy to generate and forward a service call to the service code specified in the snooped Uniform Resource Identifier. In response, Envoy may look into the RouteRule to identify the local Envoy instance or sidecar proxy associated with the snooped service code instance at which point it will send a service call to the appropriate software component notifying that a client request is destined for the function code associated with the snooped Uniform Resource Identifier, and thus to bring up the appropriate function code.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method for implementing automatic instantiation of relevant code segments in a service mesh environment comprising:
   snooping at least one identifier from one or more response packets generated by an execution of a code segment from a plurality of code segments having a preferred execution sequence, wherein the at least one identifier at least identifies a next code segment in the preferred execution sequence;
   in response to snooping the at least one identifier and prior to receiving a request to instantiate the next code segment, preemptively instantiating the next code segment in the preferred execution sequence, wherein
   an initial code segment from the plurality code segments is instantiated in response to a trigger.

2. The method of claim 1, wherein the plurality code segments associated with the preferred execution sequence corresponds to a plurality of micro tasks involved in executing a macro task.

3. The method of claim 1, wherein the trigger comprise a destined request to the initial code segment.

4. The method of claim 1, wherein the trigger corresponds to an interesting packet or a request for a specific function.

5. The method of claim 1, wherein the trigger corresponds to a scheduled task, web request, queue message or a manual invocation.

6. The method of claim 1, wherein the at least one identifier is a Uniform Resource Identifier of the one or more response packets.

7. The method of claim 1, wherein each code segment corresponds to a service and the plurality of code segments having the preferred execution sequence corresponds to a service chain.

8. The method of claim 1, wherein each code segment from a plurality code segments correspond to a function in a Serverless computing architecture.

9. The method of claim 8, wherein the Serverless computing architecture is implemented within a service mesh.

10. A method for improving response time of a service mesh comprising:
    preemptively instantiating a next code segment identified based on a snooping at least one identifier from of one or more response packets generated from an execution of a preceding code segment, wherein the at least one identifier at least identifies the next code segment in a preferred execution sequence; and
    repeating the snooping and the instantiating operations for each code segment in the preferred execution sequence, following a triggered execution of an initial code segment, for a plurality of code segments having the preferred execution sequence.

11. The method of claim 10, wherein the at least one identifier is a Uniform Resource Identifier filed of the one or more response packets.

12. The method of claim 10, wherein each code segments corresponds to a service code and the plurality of code segments having a preferred execution sequence corresponds to a service chain.

13. The method of claim 10, wherein the triggered execution of the initial code segment is caused by a destined request to the initial code segment.

14. The method of claim 10, wherein the triggered execution of the initial code segment is caused by a detection of an interesting packet or a request for a specific function.

15. The method of claim 10, wherein the triggered execution of the initial code segment is caused by any one of a scheduled task, a web request, a queue message or a manual invocation.

16. The method of claim 12, wherein the service chain is implemented in accordance to a Serverless model.

17. A non-transitory computer-readable medium comprising computer executable instructions stored thereon, the instructions when executed are effective to cause a computer to:

snoop at least one identifier from one or more response packets generated by an execution of a code segment from a plurality of code segments having a preferred execution sequence, wherein the at least one identifier at least identifies a next code segment in the preferred execution sequence;

in response to snooping the at least one identifier and prior to receiving a request to instantiate the next code segment, preemptively instantiate the next code segment in the preferred execution sequence, wherein an initial code segment from the plurality code segments is instantiated in response to a trigger.

18. The non-transitory computer-readable medium of claim 17, wherein the at least one identifier is a Uniform Resource Identifier of the one or more response packets.

19. The non-transitory computer-readable medium of claim 17, wherein each code segment corresponds to a service code and the plurality of code segments having the preferred execution sequence corresponds to a service chain.

20. The non-transitory computer-readable medium of claim 17, wherein the trigger comprises any one of a destined request to the initial code segment, detection of an interesting packet, detection of a request for a specific function, a scheduled task, a web request, a queue message and a manual invocation.

* * * * *